UNITED STATES PATENT OFFICE.

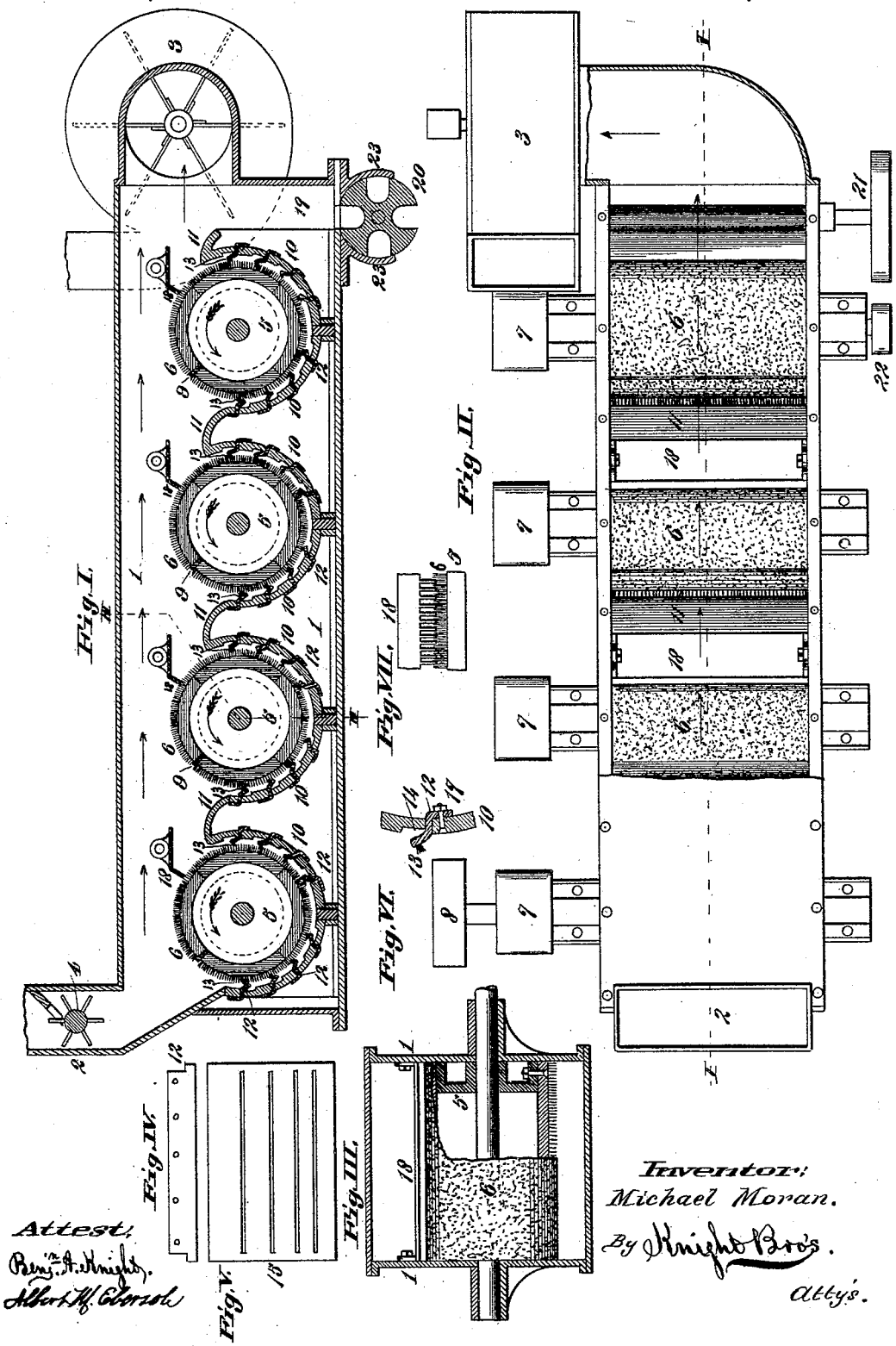

MICHAEL MORAN, OF ST. LOUIS, MISSOURI, ASSIGNOR TO RICHARD T. BLOW AND VICTORIA MORAN, OF SAME PLACE.

MACHINE FOR REMOVING LINT FROM COTTON-SEEDS.

SPECIFICATION forming part of Letters Patent No. 500,102, dated June 20, 1893.

Application filed February 11, 1893. Serial No. 461,992. (No model.)

*To all whom it may concern:*

Be it known that I, MICHAEL MORAN, of the city of St. Louis, in the State of Missouri, have invented a certain new and useful Improvement in Machines for Removing Lint from Cotton-Seeds, of which the following is a full, clear, and exact description, reference being had to the accompanying drawings, forming part of this specification.

My invention relates to an improved machine for removing the lint or fiber from seeds bearing such lint or fiber cotton seed for example; and my invention consists in features of novelty hereinafter fully described and pointed out in the claims.

Figure I is a vertical, longitudinal section, taken on line I—I, Fig. II, and illustrative of my invention. Fig. II is a top or plan view, with part of the top of the case removed. Fig. III is a vertical section, taken on line III—III, Fig. I. Fig. IV is a view of one of the ribs of the concaves. Fig. V is a view of one of the concaves. Fig. VI is an enlarged, detail section, showing part of one of the concaves with the rib applied. Fig. VII is an enlarged, detail view, showing part of one of the cylinders, and part of one of the combs.

Referring to the drawings, 1 represents a case or housing having a feed-hopper 2 at one end, and an exhaust fan 3 at the other end.

4 is a shaft, provided with prongs, and located in the hopper 2 to form a forced feed to the seeds, which are deposited in the hopper.

5 represents a number of cylinders located in the case or housing 1, and which are provided with brushes or bristles 6 on their peripheries, as shown in Fig. I. The shaft of each cylinder is projected beyond the casing and provided with a pulley 7 to receive a connecting belt, and the shaft of one of the cylinders is provided with a pulley 8 to receive a belt from a suitable motive power. Each cylinder is preferably provided with a bar 9 which extends beyond the periphery of the cylinder, but not beyond the bristles, so that if there is any tendency for the seed to clog between the cylinders and the concaves, these ribs or bars will force them along. Beneath each cylinder is a concave 10, the adjacent edges of the concaves being connected between the cylinders by a portion 11, which is preferably inclined, as shown in Fig. I. Each concave is provided with a number of ribs 12, which extend beyond the face of the concave. These ribs are preferably made of stiff leather, and they are also preferably provided with bristles 13, as shown in Fig. VI. The concaves are recessed, as shown at 14, to permit the ribs to yield backwardly. I prefer to attach the ribs by passing them through slots 15 in the concaves, (see Figs. V and VI,) and connecting them to the concaves by bolts 17. One of the ribs is shown removed in Fig. IV.

18 is a comb arranged over each cylinder, (see Figs. I and VII,) the function of which is to remove any lint that may be clinging to the cylinders.

The fan 3 communicates with the interior of the case or housing, as shown in Figs. I and II, and at the tail end of the machine there is a chute 19, through which the seeds fall onto a grooved cylinder 20, the shaft of which is extended to receive a pulley 21, which receives a belt from a pulley 22 on the shaft of the near cylinder 5. The grooved cylinder is thus turned constantly to deposit the seeds while air is excluded through means of a housing 23, partially surrounding the cylinder, making a pneumatic valve that closes ingress of air to the cylinder 3.

The operation is as follows:—The seeds containing the fiber are deposited into the front end of the case, or housing, through the hopper tube, and are conveyed through between the first cylinder 5 and its concave, the bristles on the cylinder and on the ribs 12 acting to remove the fiber from the seeds. As the seeds emerge from the first cylinder and pass to the next, the fiber which has been loosened is withdrawn from the case or housing by the fan 3, and deposited into a suitable settling room. As the seeds pass between the next cylinder and concave, more fiber is removed from them, which is drawn out by the fan, and the operation is repeated until the seeds are discharged from the last cylinder, and fall through the chute 19.

It is obvious that any desired number of cylinders and concaves may be employed.

The bristles on the surface of the cylinders and on the ribs may be either animal bristles or bristles made from hard wood or wire, or other suitable material. It will also be seen that the peripheral brushes or bristles 6 on the cylinders 5 have two-fold functions, first, a direct action on the seed to clean the same; and, second, a secondary action on the comb 18, that cleans off the secretions thereon, so that said comb is constantly clean, and said comb 18 is thus enabled to perfectly perform its function for the removal of any lint that gathers and clings to the cylinders.

The above described double functions of said peripheral bristles, make a much more effective cleaning machine, because at the same time and by the same constructive means, they both clean the seed and in combination with said comb that they keep clean, the rolls are continuously preserved clean and effective and said peripheral bristles are themselves, in turn, combed clean by the comb 18, a result that could not otherwise be effected by mutually foul peripheral bristles 6 and alike foul comb 18.

The bristles 6 on the periphery of the cylinders perform the function of cleaning the fiber from the seed, and at the same time clean the fibers from the bristles 13 on the ribs 12.

I claim as my invention—

1. In a machine for removing fiber from seeds, the combination of a housing, cylinders arranged within the housing and provided with bristles on their peripheries, concaves located beneath the cylinders, ribs on the concaves, and an exhaust fan; said concaves having recesses to permit the ribs to yield away from the cylinders; substantially as and for the purpose set forth.

2. In a machine for removing fiber from seeds, the combination of a housing, cylinders located within the housing, and having bristles on their peripheries, concaves located beneath the cylinders, yielding ribs secured to the concaves and projecting into the cylinder, and having bristles on their free ends, and an exhaust fan, substantially as and for the purpose set forth.

3. In a machine for removing lint from seeds, the combination of a housing, cylinders located within the housing, and having bristles on their peripheries and having bars or ribs 9, combs 18 secured in said housing, concaves located beneath the cylinders, ribs secured to said concaves, and provided with bristles, an exhaust fan, and a grooved discharge cylinder at the end of the housing; substantially as and for the purpose set forth.

MICHAEL MORAN.

In presence of—
BENJN. A. KNIGHT,
ALBERT M. EBERSOLE.